(12) United States Patent
Mastie et al.

(10) Patent No.: US 6,182,096 B1
(45) Date of Patent: Jan. 30, 2001

(54) METHOD AND APPARATUS OF CREATING HIGHLY PORTABLE OUTPUT FILES BY COMBINING PAGES FROM MULTIPLE INPUT FILES

(75) Inventors: Scott David Mastie, Longmont; Christopher Brian Hirsch, Arvada, both of CO (US)

(73) Assignee: International Business Machines Corporation, Armonk, NY (US)

( * ) Notice: Under 35 U.S.C. 154(b), the term of this patent shall be extended for 0 days.

(21) Appl. No.: 09/107,333

(22) Filed: Jun. 30, 1998

(51) Int. Cl.[7] .................................................. G06F 17/21
(52) U.S. Cl. ............................ 707/517; 707/522; 707/513
(58) Field of Search ..................................... 707/512, 513, 707/514, 515, 522, 523, 517; 358/1.15, 1.9

(56) References Cited

U.S. PATENT DOCUMENTS

| | | | |
|---|---|---|---|
| 5,319,748 | * | 6/1994 | Motoyama .......................... 345/501 |
| 5,438,650 | * | 8/1995 | Motoyama et al. ................ 358/1.15 |
| 5,493,635 | * | 2/1996 | Brindle et al. ...................... 358/1.15 |
| 5,713,032 | * | 1/1998 | Spencer ................................. 707/515 |
| 5,745,658 | * | 4/1998 | Gerety ................................... 358/1.2 |
| 5,752,697 | * | 5/1998 | Mndel et al. ......................... 271/288 |
| 5,778,183 | * | 7/1998 | Filion et al. .......................... 709/223 |
| 5,822,503 | * | 10/1998 | Gass, Jr. et al. ..................... 358/1.9 |
| 6,014,765 | * | 1/2000 | Maeda et al. ......................... 714/748 |

* cited by examiner

*Primary Examiner*—Stephen S. Hong
(74) *Attorney, Agent, or Firm*—David W. Victor; Konrad Raynes & Victor LLP (57) ABSTRACT

A method and apparatus for creating a highly portable output file is described. For one embodiment of the present invention, the output file is PostScript file that includes DSC comments. Document comments are created in the output file to reflect the document framework. Page comments are created in the output file to reflect one or more pages within the document framework. Inappropriate comments are removed from one or more pages within the output file.

30 Claims, 4 Drawing Sheets

METHOD AND APPARATUS OF CREATING HIGHLY PORTABLE OUTPUT FILES BY COMBINING PAGES FROM MULTIPLE INPUT FILES

CROSS-REFERENCE TO RELATED COPENDING PATENT APPLICATIONS

The following patent applications which are assigned to the assignee of the present invention cover subject matter related to the subject matter of the present invention: "Method and Pages, Apparatus to Facilitate Creation of Documents from Individual having application Ser. No. 09/109,990; and "Method and Apparatus for Improving Page Description Language (PDL) Efficiency by Recognition and Removal of Redundant Contracts", having application Ser. No. 09/107,543; all are assigned to International Business Machines Corporation by Scott Mastie, et al. And all are filed concurrently herewith.

BACKGROUND OF THE INVENTION

1. Field of the Invention

The present invention relates to a method and apparatus for processing output files, and more specifically, to creating an output file that is highly portable to other systems and devices.

2. Description of Related Art

Printing refers to the reproduction of words and pictures on a page or document. Today, the high volume production machines of the major printing processes are the presses, which use plates (or other types of image carriers) to transfer the ink onto the paper or substrate. These processes are often used to support markets such as commercial printing, magazines, newspapers, catalogs, books, business forms, greeting cards, maps, labels, packaging, and other printed products.

With the development of digital image processing, new vistas have opened up for plate making and film making processes used in conventional printing presses operations. Instead of being dependent on the prepress operations of film making, image carriers can be made directly from the same digital data without the need for films and assembling them into plate layouts. Photography is gradually being replaced by digital imaging systems. Dry processless films are often used today. Digital cameras and Photo CDS are decreasing the need for scanners. Prepress for many printing processes is migrating to device independent desktop publishing hardware and software.

Furthermore, with digital imaging, digital printing systems may be used to improve the productivity, quality, and efficiency of many printing operations. Many digital printing systems use a plateless printing process. Common plateless digital printing processes include electrophotography, ink-jet, and thermal transfer, etc. Digital printing systems are often desirable over printing press processes because (1) most of the equipment are suitable for an office environment (2) its capabilities of variable printing from impression-to-impression; and (3) requires less manual skills than printing on conventional plate presses.

As the printing industry transitions from conventional printing press operations to digital prepress operations and digital printing operations to take advantage of the technological advances made in digital imaging, it is possible to provide a more automated printing process.

It is particularly advantageous to provide a single output file that is compatible with various output devices such as a Postscript® file. PostScript is a registered trademark of Adobe Systems. PostScript is a page description language developed by Adobe Systems to describe an image for printing (i.e., both text and graphics). Today, PostScript is widely adopted by the printing industry, that is, virtually every application program running in every desktop computer outputs PostScript and virtually every printer of every type, including some sophisticated prepress and even press systems, accept PostScript-coded files. The primary advantage of PostScript is device independence (i.e., images are not defined according to the characteristics of a particular device but independently).

However, problems can arise, even with "working" PostScript files, if the file is transferred to another operating system or printed on another output device. One tool that Adobe provides to create a PostScript file that is highly portable between systems and devices and makes post-processing possible is referred to as the Document Structuring Conventions (DSC). DSC provides a convention for commentary and organization of PostScript files that make PostScript files highly portable. DSC comments are an extension to the actual PostScript page description language and have become an integral part of PostScript. Implementing these DSC conventions is often regarded as an important step towards creating "good" PostScript files. By providing a highly portable output file, the output file can be used by various applications for further processing (e.g., off-site vendor applications, pre-press applications, etc.).

Today, Adobe provides a tool referred to as the "Distiller" for converting a multiple-page PostScript file without DSC comments into a multiple-page PostScript file that is DSC compliant. However, the Distiller does not have the capability to add DSC comments while assembling a collection of input files into a single output file, or correcting for any erroneous comments (e.g., DSC comments or some other convention for creating highly portable files).

SUMMARY OF THE INVENTION

It is an object of the present invention to provide an output file that is highly portable between various systems and devices.

A method and apparatus for creating a highly portable output file is described. For one embodiment of the present invention, the output file is PostScript file that includes DSC comments. Document comments are created in the output file to reflect the document framework. Page comments are created in the output file to reflect one or more pages within the document framework. Inappropriate comments are removed from one or more pages within the output file.

One aspect of the present invention describes creating DSC-compliant comments at the beginning and/or end of the document.

Another aspect of the present invention describes creating DSC-compliant comments at the beginning and/or end of one or more pages within the output file.

An additional aspect of the present invention describes removing inappropriate comments by replacing them with modified DSC-comments.

A further aspect of the present invention describes selectively removing inappropriate comments and replacing them with modified DSC comments.

Another aspect of the present invention describes removing inappropriate comments (all or selected ones) and not replacing them with modified DSC comments.

Other objects, features, and advantages of the present invention will be apparent from the accompanying drawings and from the detailed description below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

The present invention provides a method and apparatus of creating an output file that is highly portable to various other systems and devices. The output file, which may contain the entire contents of the digital document, is then sent to a digital printing system (e.g., the IBM InfoPrint family of printers and various other PostScript printers) as a single print job for printing, sent to some other type of output device (e.g., plate making or film making equipment), or stored on a removable storage medium (e.g., cd-rom, floppy disk, etc.) which may then be sent to a vendor for additional pre-press operations and printing. Furthermore, for one embodiment of the present invention, the highly portable output file can be created while assembling the output file from a collection of input files.

For one embodiment of the present invention, the highly portable output file is a PostScript file that includes Document Structure Conventions (DSC) comments. PostScript is a page description language (PDL) developed by Adobe Systems, Inc. that can be used to specify the contents of a page that is to be printed. For alternative embodiments of the present invention, the highly portable output file may be another type of Page Description Language (PDL) file (e.g., a derivative of PostScript) that may be highly portable in it of itself, or may use a special type of convention, format, or structure to make it highly portable. Alternatively, the output file may not be a PDL file.

Today, many applications require that a PostScript output file be compliant with Adobe's Document Structuring Conventions (DSC). DSC provides a convention for commentary and organization of PostScript files to ensure that the PostScript file is highly portable to other applications (e.g., off-site vendor applications and pre-press applications). If the DSC compliant output file is created while assembling a collection of input files to form the DSC compliant output file, DSC comments which are inappropriate in the output file context may need to be corrected and new comments may need to added to the output file to reflect the document framework of the output file.

Figure 1:
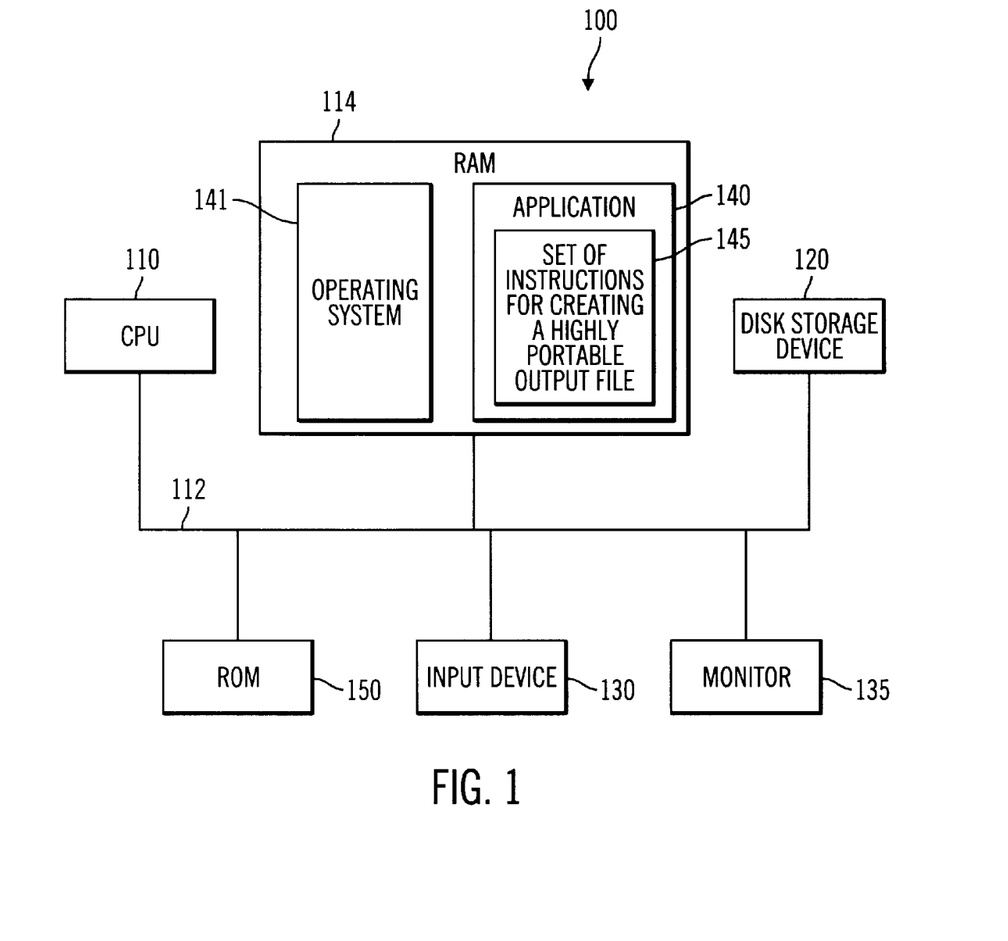
FIG. 1 illustrates one embodiment of a computer system for implementing the present invention.

FIG. 1 illustrates a data processing system 100 for creating a highly portable output file in accordance with one embodiment of the present invention. It is within the scope of the present invention for data processing system 100 to consist of a workstation, server, personal computer system, set top box, or any other device that may create a highly portable output file.

A central processing unit (CPU) 110, such as one of the PC microprocessors available from International Business Machines Corp., is provided for processing data and executing instructions. The CPU 110 is interconnected to various other components by a system bus 112.

An operating system 141 runs on CPU 110, provides control and is used to coordinate the function of the various components shown in FIG. 1. Operating system 141 may be one of the commercially available operating systems. An application program 140, which includes a set of instructions 142 for creating a highly portable output file (to be subsequently described in detail), runs in conjunction with operation system 141 which implements the various functions to be performed by application program 140.

Also shown in FIG. 1, application program 140 includes a set of instructions 145 for creating a highly portable output file, according to one embodiment of the present invention, as is described in more detail below. In alternative embodiments, the set of instructions for creating a highly portable output file could be stored in memory exclusive of application program 140, or alternatively, could be implemented in hardware circuitry or firmware (e.g., read-only-memory).

Random access memory (RAM) 114 is coupled to system bus 112. The software components (e.g., operating system 141 and application 140) are loaded into RAM 114, which operates as the data processing system's main memory.

Also coupled to system bus 112 is an input device 130 for entering data into system 100, a monitor 135 for displaying data, a disk storage device 120 for storing data and instructions, and a read only memory (ROM) 150 for controlling the basic computer functions (e.g., basic input/output system (BIOS)).

Figure 2:
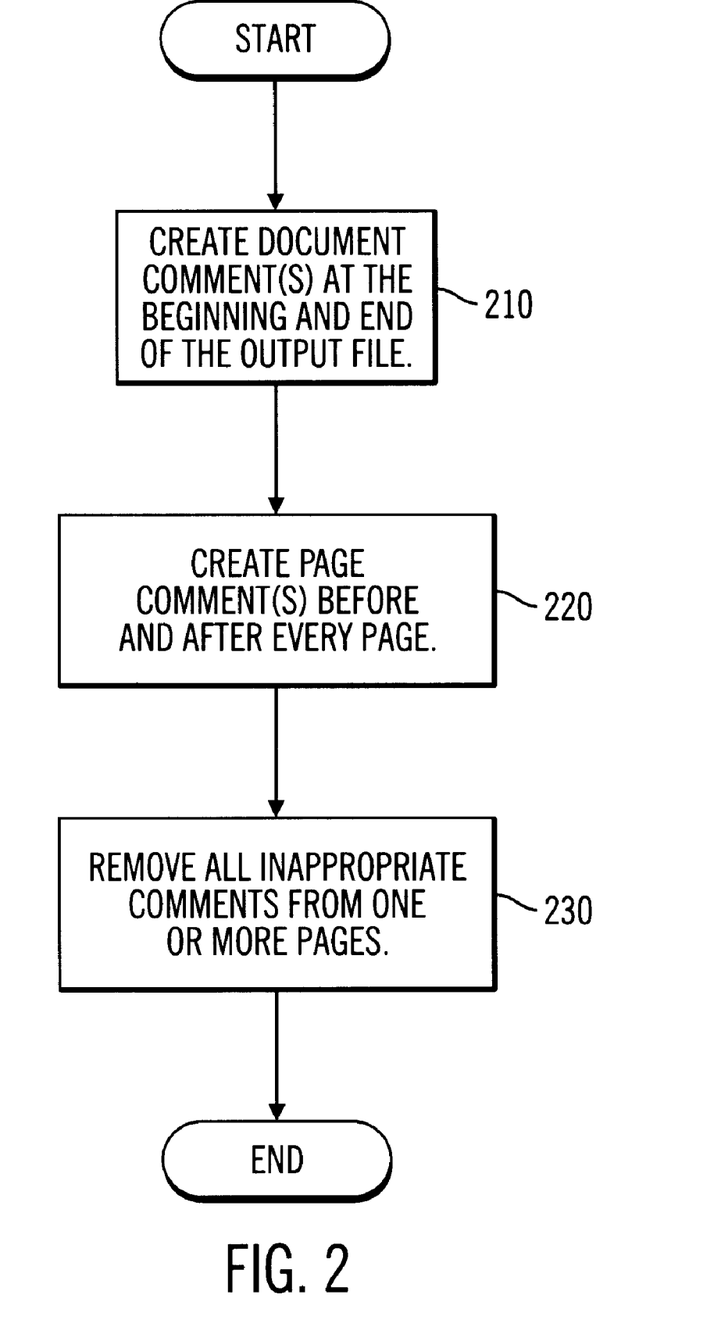
FIG. 2 illustrates a flow chart describing the steps of creating a highly portable output file in accordance with one embodiment of the present invention.

FIG. 2 illustrates a flowchart for creating an output file that is highly portable with various systems and devices. For one embodiment of the present invention, the output file may be a PostScript file that includes DSC comments. However, it should noted that the output file of the present invention is not limited to DSC compliant PostScript files, and can be extended to other commercially available PDL files as well as non-PDL files that are highly portable in it of itself or when used in conjunction with some other tool. The highly portable output file may represent a single page file (e.g., one page within a document), a small multiple-page file (e.g., a small group of pages within a document), large multiple-page files (e.g., all pages within a chapter or section of a document), or document files (e.g., all pages within a document).

According to FIG. 2, the first step 210 is to create comments (e.g., DSC comments) at the beginning and the end of the output file to reflect the document framework. The next step, 220 is to create comments at the beginning and end of every page within the output file to reflect one or more pages within the document framework. The last step 230 is to remove all inappropriate comments from the page data. For one embodiment of the present invention, the comments may be removed by modifying the comment indicator for all or selective comments. For example, the comment indicator for DSC comments is "%%". Thus, "%%" may be modified to "%A" to reflect a modified DSC comment. For an alternative embodiment, the entire comment, including the comment indicator, may be removed.

Figure 3:
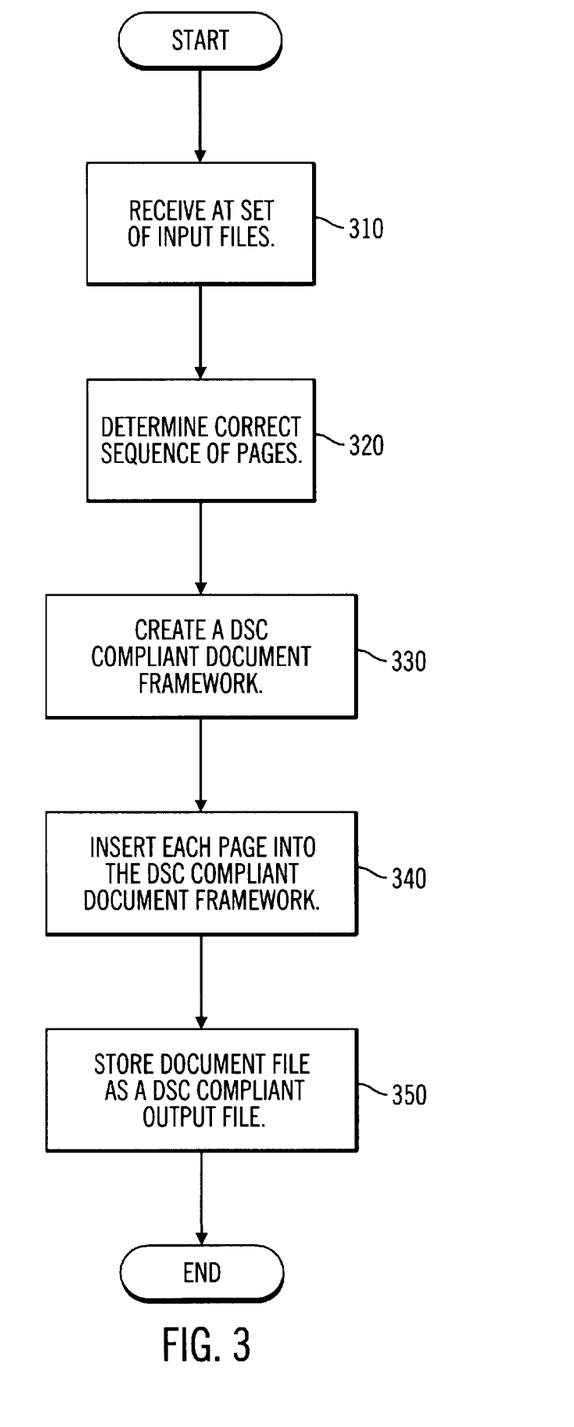
FIG. 3 illustrates a flow chart describing the steps of creating a DSC compliant PostScript document file while assembling PostScript document file from a collection of input files in accordance with one embodiment of the present invention.

FIG. 3 illustrates a flowchart for creating a DSC compliant document file while assembling the document file from a set of input PostScript files in accordance with one embodiment of the present invention. The PostScript document file (or output file) generally refers to a digital document (e.g., book, catalog, pamphlet, magazine, or any other publication) having multiple pages that need to be combined. The input PostScript files may represent a single page PostScript file (with or without DSC comments) or a multiple-page PostScript file (with or without DSC comments). Note that the multiple-page PostScript file may be large enough to represent chapters or sections in a digital document.

According to FIG. 3, the method of assembling the set of input files into the document file that is DSC compliant starts with receiving the set of input files to be assembled. As stated above, each of the PostScript input files may or may not be DSC compliant.

Once the set of input files is received, in the next step 320, the correct sequence of the pages within the multiple-page document file is determined. The correct sequence of pages can be determined by various methods. For example, the correct sequence can be determined by performing an alphanumeric sort of the file names of the input page files; by checking the contents of each input page file; or by the explicit enumeration of input page files provided as additional input.

Next, a document framework for the document file, which is capable of holding all the pages within the set of input files, is created in step 330. More specifically, DSC comments are added at the beginning and end of the document file to reflect the document framework.

For one embodiment of the present invention, a special marker at the front of the file is created to indicate the total page count once all pages are inserted into the document framework. The following example illustrates a DSC compliant document header added to the DSC compliant document framework. The total number of pages is calculated and then that number is inserted into the header by the DSC comment "%% Page: 2021". This can be accomplished by creating a special mark in the output file, and then correcting the mark after determining the accurate page count. For alternative embodiments, the special marker may be placed at the end of the document file, or at other locations within the document file.

In step 340, each input file is inserted into the document framework. Note that the page(s) within the input file needs to be modified to fit into the document framework. Step 340 may require adding DSC compliant comments at the beginning and end of each input file, and adding a page number to reflect the location of the page within the document framework. Step 340 may include the option of inserting blank pages into the document framework. Step 340 will be described in further detail in accordance with FIG. 4.

Once all the pages have been transferred into the document framework, the document file which represents the digital document, is stored as a PostScript output file that is DSC compliant. The output file, which generally contains the entire contents of the digital book, is then sent to a digital printing system (e.g., the IBM InfoPrint family of printers and various other PostScript printers) as a single print job for printing, sent to some other type of output device (e.g., plate making or film making equipment), or stored on a removable storage medium (e.g., cd-rom or floppy disk) which may then be sent to a vendor for additional pre-press operations and printing.

One advantage of storing the entire digital document as one output file is that the entire book or publication may be printed (as a single job) without the need to handle multiple print files (or jobs). The reproduction of multiple page documents using multiple print jobs often require manual collating or assembling. The present invention may be used to eliminate the manual labor involved in inserting blank pages, and to provide a cost effective solution for low volume reproductions of books and other publications. Furthermore, the fact that the PostScript document file is DSC compliant, makes it highly portable to various other applications. This allows, PREPPS, Download Mechanic, and other pre-press software to operate on the assembled DSC compliant multiple-page PostScript document file. In other words, the assembled document file can be sent to vendors, or re-purposed for a variety of nonprinting applications (e.g., direct to film, web, etc.).

Figure 4:
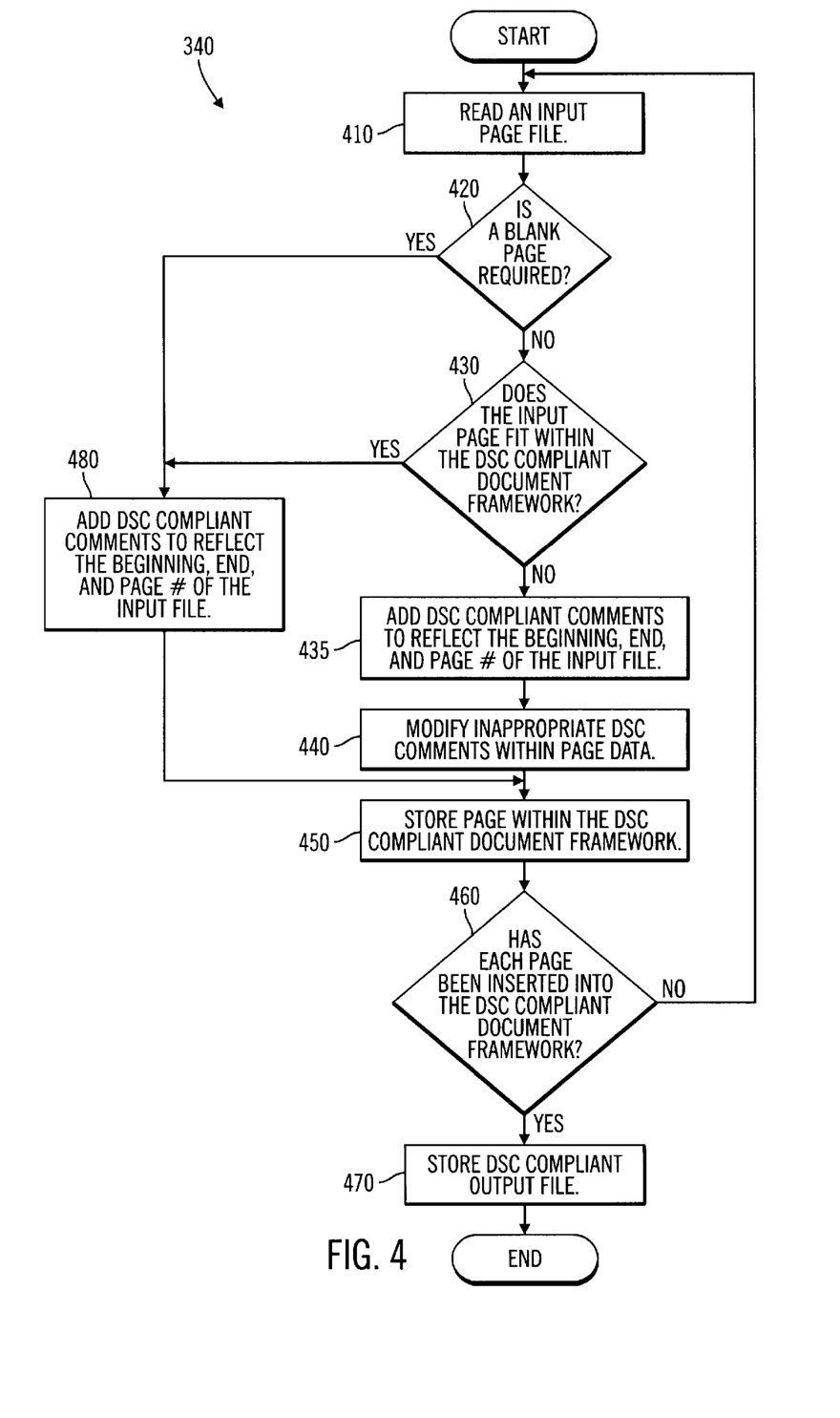
FIG. 4 illustrates a flow chart describing the steps of adding DSC comments and correcting for inappropriate DSC comments to the PostScript document file while assembling PostScript document file from a collection of input files in accordance with one embodiment of the present invention.

FIG. 4 describes the steps for inserting input PostScript files (or portions of the input PostScript files) into the document framework in accordance with one embodiment of the present invention. The input files received may or may not be DSC compliant. Thus, the input files often need to be modified to fit into its new environment, that is, the document framework.

In step 410, a first input file is read or viewed. Next, in step 420, a determination is made whether a blank page is required. For one embodiment, this determination may be made by checking the even/odd parity of the pages. For example, if page 5 is followed by page 7, then a blank page needs to be inserted after page 5 and before page 7.

If a blank page is necessary, then the flowchart proceeds to step 425. If a blank page is not required, then the flowchart proceeds to step 430. Note that the term blank page may refer to a page that is blank because it does not contain any content, or page that is intentionally left blank but includes some content (e.g., the page may have the words "intentionally left blank" printed on it), or due to a page break between chapters or sections in the document. For alternative embodiments, the insertion of blank pages may not be required and therefore step 420 may be eliminated from the flowchart.

Step 430 determines whether or not the input file fits within the DSC compliant document framework. If it does, then the flowchart proceeds to step 450, otherwise, the flowchart proceeds to step 435.

At step 435, the input page is modified (i.e., by modifying the page data) to fit into the document framework. Note that the following discussion of step 435 is also generally applicable to step 480. In performing this step, the current page environment is typically saved such that each input page can only affect its own environment, and not the environment of the other pages, or other parts of the document. Page independence is preserved by "wrapping" each page in a shielded environment. Generally, when a page is wrapped, lines are inserted before and after the page body. Note that this is a characteristic of PostScript.

In addition, DSC comments are added at the beginning and the end of the input page. Furthermore, a page number may be added to reflect the location of the input page within the DSC compliant document framework.

The following example inserts a DSC-compliant comment before the beginning of a new page in the document. Note that the "pagesource" comment is a unique new addition, to provide information in the DSC-compliant file about another file that was the source of the PostScript for each particular page.

%%Page 37789 2
%%Page Source: pg37789.ps

In step 440, the input page is further modified to fit into the DSC compliant document framework. In general, comments starting with "%%" are recognized by many applications (e.g., viewer, pre-press, etc.) to be DSC comments. As stated above, the input page files may include DSC comments. Once the input pages are inserted into the DSC compliant document framework, the DSC comments from the input page files are often not appropriate in the new document file context.

For one embodiment of the present invention, all such DSC comments identified by "%%" are modified to represent a quasi DSC comment. Quasi DSC comments start with "%A" where "A" represents any character other than "%". By modifying the DSC comments in this manner, applications searching for DSC comments will not recognize the quasi DSC comment as a DSC comment. Although the "%A" comment is hidden from DSC compliant applications, the actual comment may be preserved and recognized as a modified or quasi DSC comment. It should be noted that "%%" represents the PostScript comment indicator. For alternative embodiments, it is not required that the comment indicator be modified in the manner described above, particularly when the comment indicator for the file is different from "%%".

For an alternative embodiment, only selected DSC comments are modified in the manner described above. Alternatively, the entire comment, including the comment indicator, may be removed from all or a selected group within the output file.

The following is an example of a comment ("%%trailer") which was DSC-compliant in the input page file, but became incorrect when the page was assembled in the larger document and viewed in context with all the other pages of the document. After being modified, this comment does not cause DSC-compliance problems:

%ATrailer

The following is an example of an "EOF" comment. For any given file, there can be only one end of file comment, yet this comment can appear multiple times in an assembled document, creating many inaccurate comments. These comments can be corrected by modifying inappropriate "EOF" comments to be "hidden." Furthermore, a new "EOF" comment is created to reflect the end of the document file.

The following is an example of DSC-compliant comments inserted at the end of the document. These comments are new comments which are accurately positioned given this page's context within a large document:

%%Trailer

%%EOF

After step 440, the input file is stored within the DSC compliant document framework as shown in step 350.

Next, in step 460, a determination is made as to whether all of the input pages have been inserted into the DSC compliant document framework. If not, the flowchart returns to step 410 to read or view the next input file. Once the last input has been inserted into the DSC compliant document framework, the document, which now represents the contents of the entire digital document in a single document file, is saved and stored as the output file as shown in Step 470. The output file may then be sent or provided to a printer to reproduce the entire book (or publication) as a single job or sent to some other output device for further processing.

Although FIGS. 3 and 4 describe creating the DSC compliant PostScript output file while assembling the collection of input files to create the DSC compliant output file, the DSC compliant document file may be created independent of the assembly process.

The present invention of creating a highly portable output file may be provided as a computer program product which may include a machine readable medium having stored thereon instructions which can be used to program a computer (or other electronic devices) to perform a process according to the present invention. The machine readable medium may include, but is not limited to, floppy disks, optical disks, cd-roms, magneto-optical disks, ROMs, RAMS, EPROMs, EEPROMs, magnetic or optical cards, or any type of media/machine readable medium suitable for storing electronic instructions.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A computer implemented method of creating a highly portable output file, comprising:

(a) creating document comments to reflect a document framework;

(b) inserting pages from input files into the document framework;

(c) creating page comments to reflect one or more pages within the document framework;

(d) inserting the page comments into the pages inserted into the document framework;

(e) determining comments in the inserted pages from the input files that are not relevant in a context of the inserted page in the document framework;

(f) modifying comments in the inserted pages that are determined to not be relevant in the context of the document framework.

2. The method of claim 1, wherein step (a) includes the step of creating DSC-compliant document comments at the beginning or end of the output file.

3. The method of claim 1, wherein step (c) includes the step of creating DSC-compliant page comments at the beginning or end of one or more pages within the output file.

4. The method of claim 1, wherein step (c) includes the step of removing all of the determined comments from one or more pages within the output file.

5. The method of claim 1, further comprising:

determining a correct sequence of the pages inserted into the document framework; and adding a page number as one page comment to each inserted page.

6. The method of claim 1, wherein the created document comments indicate a total number of the pages inserted into the document framework.

7. The method of claim 1, further comprising:

determining whether a blank page is needed when inserting the pages from the input files into the document framework; and inserting a blank page at a location where the blank page is needed.

8. The method of claim 1, wherein modifying the comments comprises adding information about the input file from where the page inserted into the document framework originated.

9. The method of claim 1, wherein the comments are in a standard comment format and wherein modifying the comments in the standard comment format comprises modifying a comment identifier of the determined comments in order that the modified comment will not be recognized as in the standard comment format.

10. The method of claim 9, further comprising modifying only selected ones of the determined comments.

11. A system for creating a highly portable output file, including:
   a processor;
   an application program, on a computer useable medium, capable of causing the processor to perform:
   (a) creating document comments to reflect a document framework;
   (b) inserting pages from input files into the document framework;
   (c) creating page comments to reflect one or more pages within the document framework;
   (d) inserting the page comments into the pages inserted into the document framework;
   (e) determining comments in the inserted pages from the input files that are not relevant in a context of the inserted page in the document framework;
   (f) modifying comments in the inserted pages that are determined to not be relevant in the context of the document framework.

12. The system of claim 11, wherein the application program is further capable of causing the processor to perform creating DSC-compliant document comments at the beginning or end of the output file.

13. The system of claim 11, wherein the application program is further capable of causing the processor to perform creating DSC-compliant page comments at the beginning or end of one or more pages within the output file.

14. The system of claim 11, wherein the application program is further capable of causing the processor to perform removing all of the determined comments from one or more pages within the output file.

15. The system of claim 11, wherein the application program is further capable of causing the processor to perform:
   determining a correct sequence of the pages inserted into the document framework; and
   adding a page number as one page comment to each inserted page.

16. The system of claim 11, wherein the created document comments indicate a total number of the pages inserted into the document framework.

17. The system of claim 11, wherein the application program is further capable of causing the processor to perform:
   determining whether a blank page is needed when inserting the pages from the input files into the document framework; and
   inserting a blank page at a location where the blank page is needed.

18. The system of claim 11, wherein modifying the comments comprises adding information about the input file from where the page inserted into the document framework originated.

19. The system of claim 11, wherein the comments are in a standard comment format and wherein modifying the comments in the standard comment format comprises modifying a comment identifier of the determined comments in order that the modified comment will not be recognized as in the standard comment format.

20. The system of claim 19, wherein the application program is further capable of causing the processor to perform modifying only selected ones of the determined comments.

21. A machine readable medium having stored thereon data representing a sequence of instructions for creating a highly portable output file, the sequence of instructions which, when executed by a processor, cause the processor to perform:
   (a) creating document comments to reflect a document framework;
   (b) inserting pages from input files into the document framework;
   (c) creating page comments to reflect one or more pages within the document framework;
   (d) inserting the page comments into the pages inserted into the document framework;
   (e) determining comments in the inserted pages from the input files that are not relevant in a context of the inserted page in the document framework;
   (f) modifying comments in the inserted pages that are determined to not be relevant in the context of the document framework.

22. The machine readable medium of claim 21, wherein step (a) includes the step of creating DSC-compliant document comments at the beginning or end the output file.

23. The machine readable medium of claim 21, wherein step (c) includes the step of creating DSC-compliant page comments at the beginning or end of one or more pages within the output file.

24. The method of claim 1, wherein step (f) includes the step of removing all of the determined comments from one or more pages within the output file.

25. The machine-readable medium of claim 21, wherein the instructions further cause the processor to perform:
   determining a correct sequence of the pages inserted into the document framework; and
   adding a page number as one page comment to each inserted page.

26. The machine-readable medium of claim 21, wherein the created document comments indicate a total number of the pages inserted into the document framework.

27. The machine-readable medium of claim 21, wherein the instructions further cause the processor to perform:
   determining whether a blank page is needed when inserting the pages from the input files into the document framework; and
   inserting a blank page at a location where the blank page is needed.

28. The machine-readable medium of claim 21, wherein modifying the comments comprises adding information about the input file from where the page inserted into the document framework originated.

29. The machine-readable medium of claim 21, wherein the comments are in a standard comment format and wherein modifying the comments in the standard comment format comprises modifying a comment identifier of the determined comments in order that the modified comment will not be recognized as in the standard comment format.

30. The machine-readable medium of claim 29, wherein the instructions further cause the processor to perform modifying only selected ones of the determined comments.

* * * * *

UNITED STATES PATENT AND TRADEMARK OFFICE
CERTIFICATE OF CORRECTION

PATENT NO.     : 6,182,096 B1
DATED          : January 30, 2001
INVENTOR(S)    : Scott D. Mastie et al.

It is certified that error appears in the above-identified patent and that said Letters Patent is hereby corrected as shown below:

<u>Column 8,</u>
Line 42, delete "step (c)" and insert -- step (f) --

Signed and Sealed this

Twenty-sixth Day of October, 2004

JON W. DUDAS
*Director of the United States Patent and Trademark Office*